(12) United States Patent
Schlipf et al.

(10) Patent No.: US 8,584,991 B2
(45) Date of Patent: Nov. 19, 2013

(54) VANE HAVING A REGULATING FLAP AND A GAP COVERING DEVICE AND AN ADJUSTING MECHANISM FOR A GAP COVERING DEVICE

(75) Inventors: Bernhard Schlipf, Bremen (DE); Chris Payne, Clevedon (GB); Markus Gibbert, Bremen (DE); Tom Dostmann, Amtsberg-Dittersdorf (DE)

(73) Assignee: Airbus Operations GmbH, Hamburg (DE)

( * ) Notice: Subject to any disclaimer, the term of this patent is extended or adjusted under 35 U.S.C. 154(b) by 207 days.

(21) Appl. No.: 13/128,242

(22) PCT Filed: Nov. 10, 2009

(86) PCT No.: PCT/EP2009/008018
§ 371 (c)(1),
(2), (4) Date: Aug. 25, 2011

(87) PCT Pub. No.: WO2010/052022
PCT Pub. Date: May 14, 2010

(65) Prior Publication Data
US 2011/0297796 A1   Dec. 8, 2011

Related U.S. Application Data

(60) Provisional application No. 61/112,898, filed on Nov. 10, 2008.

(30) Foreign Application Priority Data

Nov. 10, 2008   (DE) .......................... 10 2008 056 655

(51) Int. Cl.
*B64C 3/58* (2006.01)
*B64C 9/00* (2006.01)

(52) U.S. Cl.
USPC ............................ 244/213; 244/215; 244/216

(58) Field of Classification Search
USPC .................. 244/213–217, 99.2, 99.3
See application file for complete search history.

(56) References Cited

U.S. PATENT DOCUMENTS 2,169,416 A    8/1939  Griswold et al.
2,289,704 A *  7/1942  Grant ............................ 244/225

(Continued)

FOREIGN PATENT DOCUMENTS

CN    101198520    6/2008
DE    31 14 143    10/1982

(Continued)

OTHER PUBLICATIONS

International Search Report for Application U.S. Appl. No. PCT/EP2009/008018 dated Jun. 4, 2010.

(Continued)

*Primary Examiner* — Philip J Bonzell
(74) *Attorney, Agent, or Firm* — Jenkins, Wilson, Taylor & Hunt, P.A.

(57) ABSTRACT

A wing, having an adjustable flap that can be moved between a retracted and an extended setting is provided, as well as a gap-covering device, with an adjustment lever and a gap-covering flap arranged on the latter with a flow surface. The adjustment lever with the gap-covering flap is pre-loaded by means of a pre-loading device into a first setting, in which the gap-covering flap is located in the interior of the wing. The adjustable flap and the adjustment lever with the gap-covering flap are mechanically coupled such that as the adjustable flap moves into its retracted setting, a movement of the adjustment lever takes place against the pre-load effected by the pre-loading device, into a second setting. The flow surface of the gap-covering flap in the second setting of the adjustment lever runs between the upper side of the retracted adjustable flap and the wing flow surface.

12 Claims, 2 Drawing Sheets

(56) References Cited

U.S. PATENT DOCUMENTS

| | | | | |
|---|---|---|---|---|
| 2,542,792 | A | * | 2/1951 | Bennett et al. ............... 244/216 |
| 3,112,089 | A | * | 11/1963 | Silvius ........................ 244/216 |
| 3,363,859 | A | | 1/1968 | Thomas |
| 3,375,998 | A | | 4/1968 | Alberto |
| 3,493,196 | A | | 2/1970 | McCall |
| 3,799,474 | A | * | 3/1974 | Scharzler ..................... 244/216 |
| 3,985,319 | A | * | 10/1976 | Dean et al. ................... 244/216 |
| 3,987,983 | A | * | 10/1976 | Cole ............................ 244/216 |
| 4,049,219 | A | * | 9/1977 | Dean et al. ................... 244/217 |
| 4,172,575 | A | * | 10/1979 | Cole ............................ 244/216 |
| 4,248,395 | A | * | 2/1981 | Cole ............................ 244/216 |
| 4,427,168 | A | | 1/1984 | McKinney et al. |
| 4,702,442 | A | * | 10/1987 | Weiland et al. .............. 244/216 |
| 4,834,326 | A | | 5/1989 | Stache |
| 5,094,412 | A | * | 3/1992 | Narramore .................. 244/214 |
| 6,682,023 | B2 | | 1/2004 | Broadbent |
| 7,270,305 | B2 | | 9/2007 | Rampton |
| 7,963,484 | B2 | | 6/2011 | Raudszus et al. |

FOREIGN PATENT DOCUMENTS

| | | |
|---|---|---|
| DE | 37 02 294 | 4/1988 |
| GB | 2 003 098 | 3/1979 |
| GB | 2096551 | 10/1982 |
| GB | 2 260 521 | 4/1993 |
| WO | WO 2006/133940 | 12/2006 |

OTHER PUBLICATIONS

Chinese Office Action for Application No. 200980144496.7 dated Dec. 5, 2012.

International Preliminary Report on Patentability and Written Opinion for Application Serial No. PCT/EP2009/008018 dated May 19, 2011.

* cited by examiner

VANE HAVING A REGULATING FLAP AND A GAP COVERING DEVICE AND AN ADJUSTING MECHANISM FOR A GAP COVERING DEVICE

RELATED APPLICATIONS

The present application is a national stage entry according to 35 U.S.C. §371 of PCT application No.: PCT/EP2009/008018 filed on Nov. 10, 2009, which claims priority from German Application No.: 10 2008 056 655.1, filed on Nov. 10, 2008, and from U.S. Provisional Application No.: 61/112,898, filed on Nov. 10, 2008.

TECHNICAL FIELD

Embodiments of the invention concern a wing with an adjustable flap and a gap-covering device, and also a positioning mechanism for a gap-covering device.

BACKGROUND

From U.S. Pat. No. 4,427,168 a wing leading edge formed from a one-piece Krüger flap and a sealing flap is of known art. When the Krüger flap is extended the sealing flap is also turned into the flow around the wing leading edge.

SUMMARY

Embodiments of the invention provide a wing with an adjustable flap and a gap-covering device, and also a positioning mechanism for a gap-covering device, with which mechanically reliable positioning movements of a gap-covering flap of the gap-covering device, and aerodynamically efficient positioning movements of the adjustable flap and the gap-covering flap can be implemented.

In accordance with embodiments of the invention a wing is provided with an adjustable flap and with a gap-covering device. The adjustable flap can in general be an aerodynamic body adjustably arranged on the wing of an aircraft and thereby can be e.g. a leading edge slat, a trailing edge flap or a spoiler. The adjustable flap can be moved in an edge region or a recess of a wing between a retracted and an extended setting. Here the edge region can be part of a recess of the wing, into which the adjustable flap can retract, or the edge of an end section of the wing on which e.g. a leading edge slat, or a trailing edge flap, is arranged. In the retracted setting of the adjustable flap its underside contacts the interior of the wing and its external side positioned opposite to the underside is in contact with the flow around the wing.

The gap-covering device has an adjustment lever and a gap-covering flap arranged on the latter with a flow surface. The adjustment lever with the gap-covering flap is pre-loaded by means of a pre-loading device into a first setting in which the gap-covering flap is located in the interior of the wing. In accordance with embodiments of the invention the adjustable flap and the adjustment lever with the gap-covering flap are mechanically coupled such that as the adjustable flap moves into its retracted setting the adjustment lever moves, against the pre-load effected by the pre-loading device, into a second setting. Here the flow surface of the gap-covering flap in the second setting of the adjustment lever, as viewed in the longitudinal direction of this flow surface, runs between the upper side of the retracted adjustable flap and the wing flow surface. In this state the flow surface of the gap-covering flap, together with the upper side of the retracted adjustable flap and the wing flow surface, thus form parts of a flow surface with a uniform profile.

In this context the formation of "parts of a flow surface with a uniform profile" is understood to mean that the flow surfaces of the adjustable flap, the gap-covering flap, and the wing that are adjacent to one another form an aerodynamic contour line, and thus an efficient flow surface, and in particular that the gap-covering flap does not project into the flow around the wing. In particular the gap-covering flap thereby covers the gap between the flow surfaces of the adjustable flap and the wing, or at least to a considerable extent, i.e. to at least 80%.

The gap-covering device has in particular:
- the adjustment lever with a first end section provided with a contact device and a second end section arranged on the adjustment lever opposite to the latter,
- the gap-covering flap with the flow surface arranged on the second end section,
- a mounting device for the mounting of the adjustment lever such that it can rotate between the first and the second setting on an attachment fitting of the wing,
- the pre-loading device for purposes of pre-loading the adjustment lever into the second setting, wherein the adjustment lever and the adjustable flap are arranged such that in an initial phase of the movement of the adjustable flap from the retracted setting into the extended setting the contact device, by virtue of the spring pre-load, touches the underside of the adjustable flap, which in the retracted setting of the adjustable flap is facing towards the interior of the wing, while the gap-covering flap retracts into the interior of the wing.

The contact device can in particular have a concave curved outer contour facing towards the adjustable flap 1. In particular the contact device can be designed as a wheel mounted on the first end section such that it can rotate. The wheel of the contact device can be formed from an elastic plastic.

The gap-covering flap can be formed in the shape of a plate.

Furthermore the edge of the gap-covering flap positioned adjacent to the end piece of the wing can be designed to be elastic.

In general, the gap-covering flap can have a chamfer on its edge contacting the surface of the wing, which originates from the flow surface of the gap-covering flap.

The pre-loading device can have a spring, which is fitted to the adjustment lever and the attachment fitting. Here the spring can on the one hand be held on a first retainer of the attachment fitting of the wing and on the other hand on a second retainer on the adjustment lever, wherein the second retainer is positioned between the mounting device and the second end section.

The adjustment lever can in particular be of curved design, wherein the surface facing towards the retracted gap-covering flap has a concave shape.

The flow surface of the wing can be the underside of the wing.

BRIEF DESCRIPTION OF THE DRAWINGS

In what follows examples of embodiment of the invention are described with the aid of the accompanying figures, where.

DESCRIPTION

Figure 1:
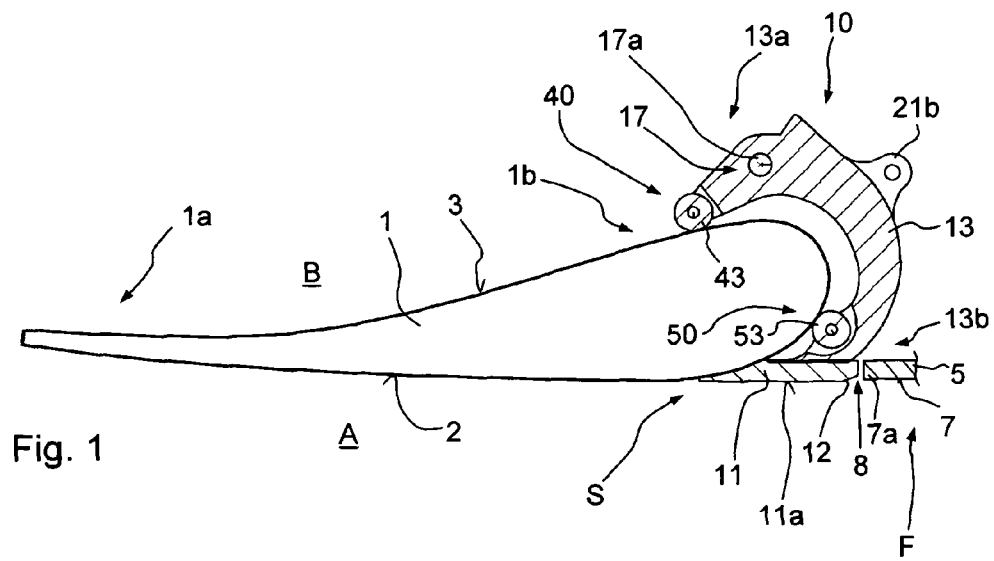
FIG. 1 shows a sectional representation of an adjustable flap in the form of a leading edge slat, which is arranged on a wing of an aircraft, and also an example of embodiment of the gap-covering device in accordance with the invention, with an adjustment lever and a gap-covering flap fitted to the latter, wherein the adjustment lever is located in the first setting of the adjustment lever, in a location in which the flow surface of the gap-covering flap is a continuation of the surface of the main wing, not represented.

FIG. 1 shows an arrangement of an adjustable flap 1, and an example of embodiment of the gap-covering device 10 in accordance with the invention with a gap-covering flap 11. Of the wing or main wing F, on which the adjustable flap 1 is arranged, only a piece of its outer skin 5 with a surface 7 is represented in FIG. 1, which forms the underside of the main wing. The adjustable flap 1 in the example of embodiment represented is a leading edge slat, which in FIG. 1 is shown in the retracted setting. In the region of a first section 1a, or on the first section 1a, the leading edge slat is articulated on an attachment device of the wing F by means of a leading edge slat positioning mechanism, not represented. With reference to the longitudinal direction of the leading edge slat 1a second section 1b is positioned opposite to the first section 1a. In the example of embodiment represented the leading edge slat positioning mechanism is designed such that as the leading edge slat 1 is extended the second section 1b, as a pivotable end of the leading edge slat, is moved in the plane of FIG. 1, firstly downwards and to the right. In the extended setting the second section 1b is positioned to the left of the first section. In this respect the leading edge slat can also be identified as a Krüger flap.

In accordance with embodiments of the invention a wing F is provided with an adjustable flap 1 and with a gap-covering device 10. The adjustable flap 1 can in general be an aerodynamic body adjustably arranged on a wing or main wing F, or on another structural component of an aircraft, and thereby can be e.g. a leading edge slat, a trailing edge flap or a spoiler. The adjustable flap 1 can be moved in an edge region of a wing F between a retracted and an extended setting. Here the edge region can be part of a recess of the wing F, into which the adjustable flap 1 can retract, or, as shown in FIG. 1, the edge of an end section of the wing on which e.g. a leading edge slat, or a trailing edge flap, is arranged.

Embodiments of the invention, and in particular the gap-covering device 10 in accordance with embodiments of the invention, can also be applied to leading edge slats that can be adjusted in another manner, and furthermore in general to other adjustable flaps of an aircraft.

The gap-covering device 10 serves thereby to cover a gap, which in the closed setting of the adjustable flap 1 would exist between the latter and the outer surface of the aircraft structure, and in particular of the wing, if the gap-covering device with the gap-covering flap 11 were not present.

The gap-covering device 10 in accordance with embodiments of the invention has furthermore an adjustment lever 13, on which the gap-covering flap 11 is fitted. The adjustment lever 13 can be moved between a first and a second setting on an attachment fitting (not represented) of the wing F. In the example of embodiment represented the adjustment lever 13 is mounted by means of a mounting device in the form of a pivot joint 17 such that it can rotate on the attachment fitting. Of the pivot joint 17, in the example of embodiment represented in FIGS. 1 to 4, the bore 17a of the adjustment lever 13 is represented as part of the pivot joint 17 for purposes of accommodating a pivot.

In general the mounting device 17 can also be configured in another manner and can e.g. be fitted with a guide track on an attachment fitting of the wing, in which a guide element fitted to the adjustment lever is accommodated and can move in a guided manner.

With the mounting device 17 the adjustment lever 13 is in general mounted on an attachment fitting 30 of the wing F such that the adjustment lever 13 can be moved between a first setting and a second setting, wherein the adjustment lever is pre-loaded by means of a pre-loading device 20 into its first setting (FIG. 4) for purposes of pre-loading the adjustment lever 13.

Figure 2:
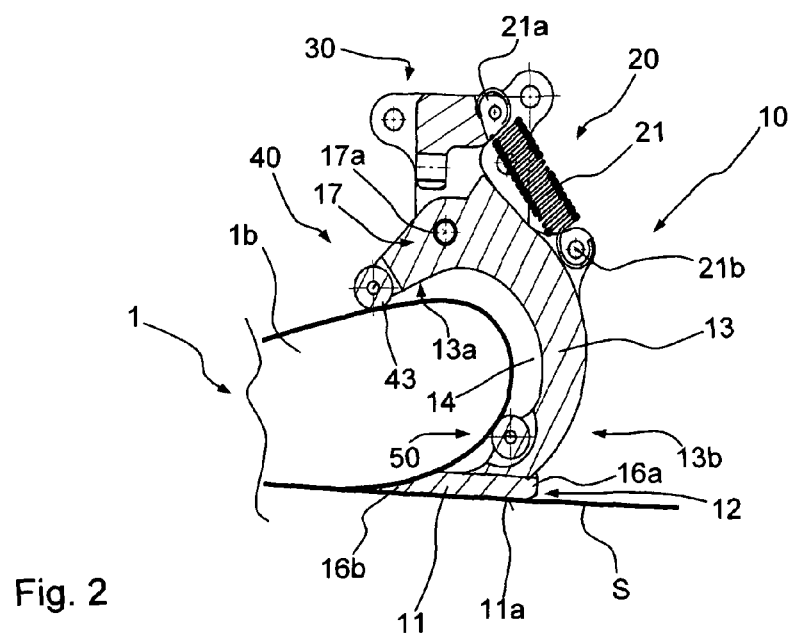
FIG. 2 shows a sectional representation of FIG. 1 with a detailed representation of the example of embodiment of the gap-covering device in accordance with the invention in its first setting.

Here in accordance with embodiments of the invention the movement of the adjustable flap 1 and the adjustment lever 13 is in addition mechanically coupled with the gap-covering flap 11, such that the movement of the adjustment lever 13 into its retracted setting (FIGS. 1 and 2) causes a movement of the gap-covering flap 11, against the pre-load of the adjustment lever 13 effected by the pre-loading device 20, from a setting in the interior of the wing B into a gap-covering setting. In the second setting of the adjustment lever 13 the flow surface 11a of the gap-covering flap runs between the upper side 2 of the retracted adjustable flap 1 and the wing flow surface 7, in each case contacting the gap-covering flap 11. In FIG. 2 the overall outer contour arising from the upper side 2 of the retracted adjustable flap 1, the flow surface 11a of the gap-covering flap 11, and the wing flow surface 7 of the wing extending near the gap-covering flap 11, is drawn as an ancillary line S, which clearly shows that in this state of the adjustable flap 1 and the gap-covering flap 11 the flow surface 11a of the gap-covering flap 11, together with the upper side 2 of the retracted adjustable flap 1 and the wing flow surface 7, form parts of a flow surface with a uniform profile.

Figure 3:
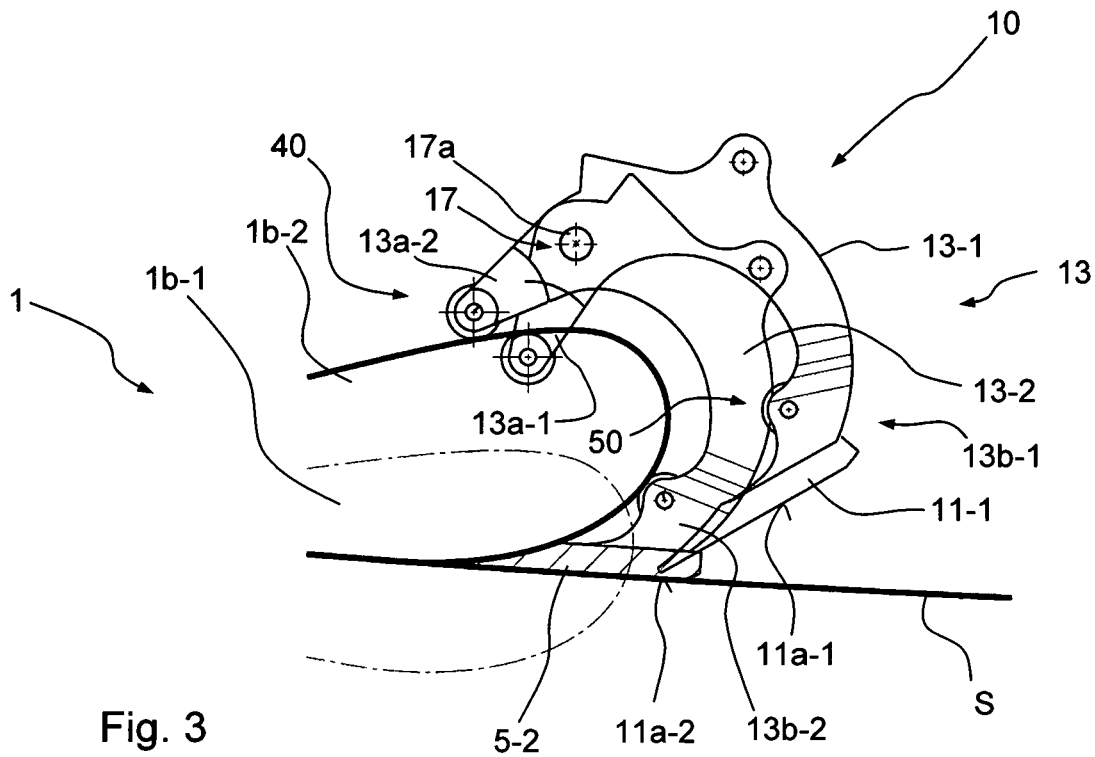
FIG. 3 shows a simplified sectional representation of the example of embodiment of the gap-covering device in accordance with the invention as per FIG. 2, wherein a part of the leading edge slat is shown in an extended setting, and the gap-covering device in the first setting, and furthermore in a representation of the leading edge slat in a retracted setting graphically superposed on this representation, and the gap-covering device in a second setting with a retracted gap-covering flap.

In the representations of FIGS. 1 and 2 the adjustable flap 1 is shown in its retracted setting, in which its upper side or outer side 2 is facing towards the external environment A, or towards the flow around the adjustable flap 1, or around the wing F and in which setting its lower side 3, positioned opposite to the upper side 2, is facing towards the interior B of the wing. Furthermore in the representations of FIGS. 1 and 2 the adjustment lever 13 is positioned in the first setting, in which the flow surface 11a of the gap-covering flap 11 forms a continuation of the surface of the main wing, not represented, i.e. the flow surface 11a of the gap-covering flap 11, the upper side 2 of the retracted adjustable flap 1, and the wing flow surface 7, form parts of a flow surface S with a uniform profile. In FIGS. 2 and 3 the uniform profile of the flow surface, which clearly arises from the parts cited above, is clearly drawn as an ancillary line S.

In accordance with an example of embodiment in accordance with the invention, the gap-covering device 10 for purposes of mechanical coupling of the adjustable flap 1 and the adjustment lever 13 with the gap-covering flap 11 has:

the adjustment lever 13, with a first end section 13a provided with a contact device 40 and a second end section 13b, the gap-covering flap 11 arranged on the second end section 13b with the flow surface 11a, a mounting device 17 for purposes of mounting the adjustment lever, on an attachment fitting 30 of the wing F, such that it can rotate between the first and the second setting, the pre-loading device 20 for purposes of pre-loading the adjustment lever 13 into the second setting, wherein the adjustment lever 13 and the adjustable flap 1 are arranged such that in an initial phase of the movement of the adjustable flap 1 from the retracted setting into the extended setting the contact device by virtue of the spring pre-load contacts the underside of the adjustable flap that in the retracted setting of the adjustable flap 1 is directed towards the interior B of the wing F, while the gap-covering flap 11 retracts into the interior B of the wing.

The adjustment lever can in particular be designed as a fully curved part with a concave inner side 14 facing towards the adjustable flap 1. In the example of embodiment in accordance with the invention represented the pre-loading device 20 has a spiral spring, which on the one hand is held on a first retainer 21a of the attachment fitting 30 of the wing F, and on the other hand is held on a second retainer 21b on the adjustment lever 13. The pre-loading device 20 can also be configured in another manner, and e.g. as a leaf spring. Here in particular the second retainer 21b can be positioned between the mounting device 17 i.e. the part of the same on the adjustment lever side, and the second end section 13b.

The contact device 40 on the first end section 13a of the adjustment lever 13 can in particular have a convex curved outer contour facing towards the adjustable flap 1, as seen from the adjustable flap 1, and can in particular be formed from an elastic material. In the form of embodiment of the contact device 40 represented this is designed as a wheel 43 mounted on the first end section 13a such that it can rotate. During the extension of the adjustable flap 1 from its retracted setting, or during the retraction of the same into its retracted setting, a relative movement of the concave curved outer contour, contacting the adjustable flap 1, of the first end section 13a, e.g. of the wheel 43, occurs relative to the outer contour 3 of the adjustable flap 1. The design of the contact device 40 as a wheel 43 mounted such that it can rotate thus reduces the friction during the cited relative movement during the extension and retraction of the adjustable flap 1.

The end piece of the contact device 40, e.g. the wheel 43, contacting the adjustable flap 1 in its retracted setting, can in particular be formed from an elastic material, in particular an elastic plastic, in order to avoid any damage to the outer contour of the adjustable flap 1.

On the adjustment lever 13 a further or second contact device 50 can be provided so as to support the adjustment lever 13 in its second setting and to ensure that the end piece 16b of the gap-covering flap 11 facing towards the adjustable flap 1 is separated from the adjustable flap in the second setting of the gap-covering flap 11 by a predetermined dimension. The second contact device 50 is positioned on the adjustment lever 13 in the vicinity of the gap-covering flap 11, or on the second end section 13b. In particular the first contact device 40 and the second contact device 50 are positioned relative to one another such that in the second setting of the adjustment lever 13 the outer surface of the gap-covering flap, contacting the contact devices 40, 50, projects inwards in the direction towards the concave inner side 14 of the adjustment lever 13. Here the outer surface of the gap-covering flap 11 projects beyond the connecting line of the contact locations of the contact devices 40, 50, with the outer surface of the gap-covering flap 11, contacting the contact devices, towards the concave inner side 14 of the adjustment lever 13. Here the adjustment lever can in particular be designed as a fully curved part with a concave inner side 14 facing towards the adjustable flap 1.

The contact device 50 arranged on the second end section 13b of the adjustment lever 13 can have a convex curved outer contour facing towards the adjustable flap 1, as seen from the adjustable flap 1, and can in particular be formed from an elastic material. In the form of embodiment of the contact device 50 represented this is designed as a wheel 53 mounted on the second end section 13b such that it can rotate. Since during the extension of the adjustable flap 1 from its retracted setting, or during the retraction of the same into its retracted setting, a relative movement of the concave curved outer contour, contacting the adjustable flap 1, of the first end section 13a, i.e. of the wheel 53, occurs relative to the outer contour 3 of the adjustable flap 1, as a result of the design of the contact device 50 as a wheel 53 mounted such that it can rotate, the friction during the cited relative movement during the extension and retraction of the adjustable flap 1 is reduced.

Figure 4:
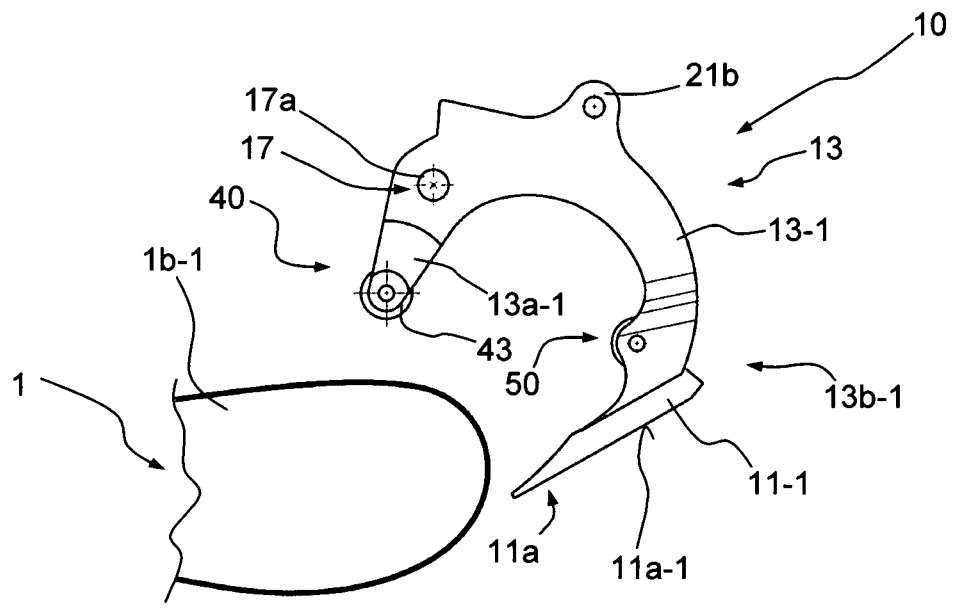
FIG. 4 shows a simplified sectional representation of the example of embodiment of the gap-covering device in accordance with the invention as per FIG. 2, in which just that part of FIG. 3 is shown that shows the part of the leading edge slat in an extended setting, and the gap-covering device in a second setting with a retracted gap-covering flap.

In FIGS. 3 and 4 the coupling of the movements of adjustable flap 1 and adjustment lever 13 by means of the contact device 40 is shown, at least in the end phase of the retraction of the adjustable flap 1 into its retracted setting (FIG. 2). In FIG. 3 are represented both the retracted setting of the adjustable flap 1 and also an extended setting of the adjustable flap 1, and also, superimposed, the related settings of the contact device 40. In FIGS. 3 and 4 an end section 1b of the adjustable flap is shown 1 in an extended state, and identified with the reference symbol 1b-1, whereas the end section 1b in the retracted state of the adjustable flap 1 is identified with the reference symbol 1b-2. Accordingly the adjustment lever 13, its first 13a and second 13b end sections, and the gap-covering flap 11, are identified in the first setting of the gap-covering device 10 with the reference symbols 13-1, 13a-1, 13b-1 and 11-1 respectively, and in the second setting of the gap-covering device 10 with the reference symbols 13-2, 13a-2, 13b-2 and 11-2 respectively.

In the form of embodiment represented the gap-covering flap 11 is formed in the shape of a plate. In general it can also be configured in another manner. In particular the gap-covering flap 11 can be formed integrally with the adjustment lever 13 and/or can be integrally manufactured with the latter. In particular the adjustment lever 13 can be manufactured integrally with the gap-covering flap 11 as an integral fibre composite component.

Furthermore, the gap-covering flap 11 can have a chamfer 12 on its edge contacting the surface 7 of the wing F, which originates from the flow surface 11a of the gap-covering flap 11. By this means it can be ensured that the edge 16a of the gap-covering flap 11 positioned adjacent to the end piece 7a of the wing F in the second or closed setting of the gap-covering flap 11 is positioned as close as possible to this edge 16a, and as small as possible an intermediate space 8 remains between the gap-covering flap 11 and the end piece 7a of the wing F in this setting of the gap-covering flap 11 whilst allowing, at the same time, the opening and closing movement of the gap-covering flap 11 relative to the end piece 7a of the wing F positioned adjacent to the latter.

Alternatively or additionally the edge 16a of the gap-covering flap 11 positioned adjacent to the end piece 7a of the wing F can be designed to be elastic. Here in particular an elastic part, such as e.g. an elastic cap, can be fitted on the edge 16a. Furthermore, such an elastically designed edge 16a can be configured and can extend beyond the end piece 7a of the wing F such that the latter in the second or closed setting of the gap-covering flap 11 is compressed or pressed against by the end piece 7a of the wing F such that no intermediate space 8 exists between the gap-covering flap 11 in the second setting and the end piece 7a of the wing F. Here the gap-covering flap 11 seals the gap 8 that arises in the extended setting of the adjustable flap 1 between the latter and the end piece 7a of the wing F.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A wing comprising a main wing having a wing flow surface and an adjustable flap that can be moved between a retracted and an extended setting, the wing comprising:
   a gap-covering device with an adjustment lever comprising a first end section and a second end section and a gap-covering flap arranged on the second end section and comprising a flow surface, the adjustment lever with the gap-covering flap being pre-loaded by means of a pre-loading device into a first setting in which the gap-covering flap is located in the interior of the wing,
   wherein the adjustment lever comprises a contact device on the first end section, the contact device being positioned such that as the adjustable flap moves into its retracted setting, the contact device comes into contact with the adjustable flap to correspondingly cause a movement of the adjustment lever against a pre-load effected by the pre-loading device into a second setting, and
   wherein the flow surface of the gap-covering flap in the second setting of the adjustment lever covers a gap formed between the upper side of the retracted adjustable flap and the wing flow surface.

2. The wing in accordance with claim 1, wherein the gap-covering device has:
   a mounting device for purposes of mounting the adjustment lever such that it can rotate between the first and the second setting on an attachment fitting of the wing,
   wherein the adjustment lever and the adjustable flap are arranged such that in an initial phase of the movement of the adjustable flap from the retracted setting into the extended setting the contact device, by virtue of the pre-load of the pre-loading device, contacts the underside of the adjustable flap, which in the retracted setting of the adjustable flap is facing towards the interior of the wing, while the gap-covering flap retracts into the interior of the wing.

3. The wing in accordance with claim 1, wherein the gap-covering flap is formed in the shape of a plate.

4. The wing in accordance with claim 1, wherein the edge of the gap-covering flap positioned adjacent to the end piece of the wing is designed to be elastic.

5. The wing in accordance with claim 1,
   wherein the gap-covering flap has a chamfer on its edge contacting the surface of the wing, which originates from the flow surface of the gap-covering flap.

6. The wing in accordance with claim 1, wherein the adjustment lever is of curved design, wherein a surface of the adjustment lever facing towards the retracted gap-covering flap has a concave shape.

7. The wing in accordance with claim 1, wherein the flow surface of the wing is the underside of the wing.

8. The wing in accordance with claim 1, wherein the contact device has a concave curved outer contour facing towards the adjustable flap.

9. The wing in accordance with claim 8, wherein the contact device has a wheel mounted on the first end section such that it can rotate.

10. The wing in accordance with claim 9, wherein the wheel of the contact device is formed from an elastic plastic.

11. The wing in accordance with claim 1, wherein the pre-loading device has a spring, which is fitted to the adjustment lever and the attachment fitting.

12. The wing in accordance with claim 11, wherein the spring is held on a first retainer of the attachment fitting of the wing and on a second retainer on the adjustment lever,
   wherein the second retainer is positioned between the mounting device and the second end section.

* * * * *